March 25, 1952     H. P. McALISTER     2,590,635
TORQUE MECHANISM

Filed July 29, 1948     2 SHEETS—SHEET 1

INVENTOR.
HUBERT P. McALISTER
BY
*Thos. Donnelly*
ATTORNEY.

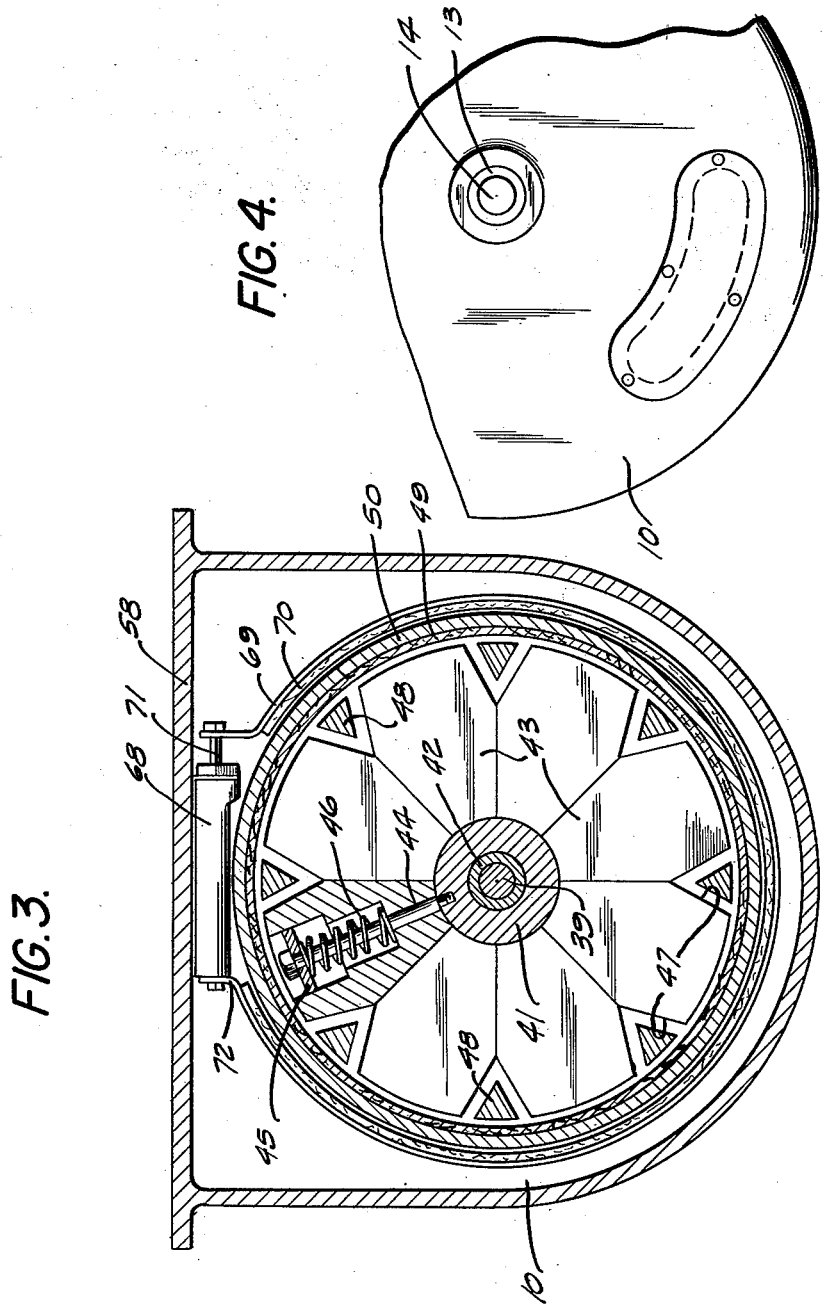

Patented Mar. 25, 1952

2,590,635

UNITED STATES PATENT OFFICE 2,590,635

TORQUE MECHANISM

Hubert P. McAlister, Wyandotte, Mich.

Application July 29, 1948, Serial No. 41,239

7 Claims. (Cl. 74—752)

My invention relates to a new and useful improvement in a variable torque mechanism adapted for transmitting power from a rotating driving body to a rotatable driven body at variable torques.

Another object of the invention is the provision of a mechanism of this class whereby variable torque may be obtained without the use of shiftable gears or clutches.

Another object of the invention is the provision of a device of this class in which a variable torque may be obtained by using a minimum of parts.

Another object of the invention is the provision of a variable torque mechanism which will be sensitive so that the exact torque required under different load conditions may be obtained.

Another object of the invention is the provision of a device of this class whereby variable torque may be obtained by virtue of a speed change thus providing the change in torque in proportion to the torque required.

Another object of the invention is the provision of a variable torque mechanism of this class which will be economical to manufacture, durable, economical to operate, and compact.

Another object of the invention is the provision of a variable torque mechanism so arranged and constructed that when used with an internal combustion engine there will be less wear on the motor and smooth acceleration and deceleration may be obtained while at the same time immediate, quick, acceleration may be obtained.

Other objects will appear hereinafter.

It is recognized that various modifications and changes may be made in the detail of structure illustrated without departing from the invention and it is intended that such shall be embraced within the scope of the claims which form a part hereof.

Forming a part of this specification are drawings in which,

Fig. 3 is a sectional view taken on line 3—3 of Fig. 1,

Fig. 4 is a fragmentary and elevational view.

Figure 1:
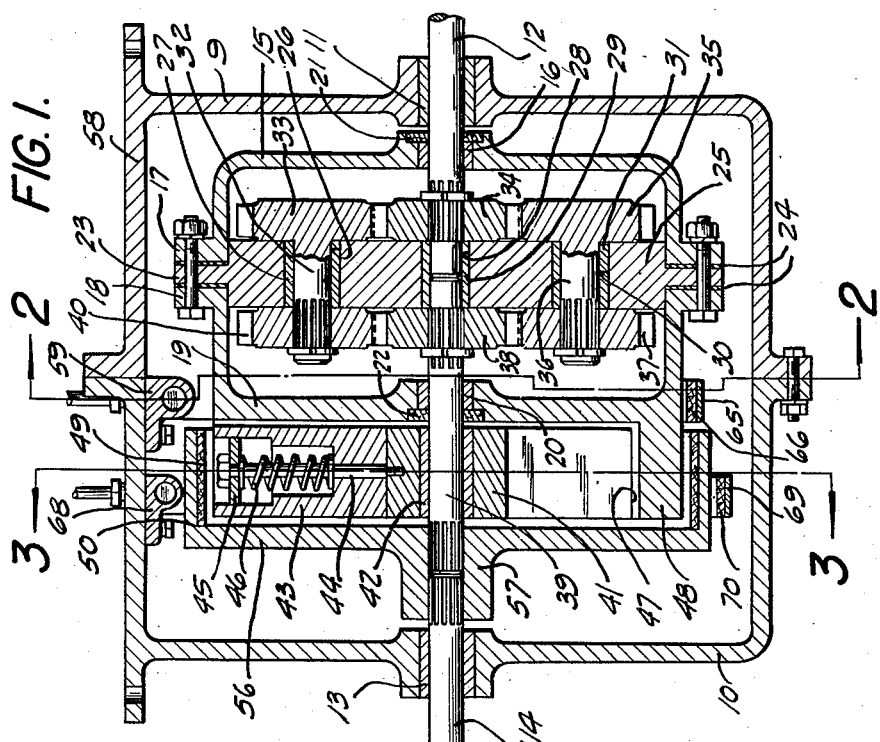
Fig. 1 is a central longitudinal, sectional view of the invention.
Figure 2:
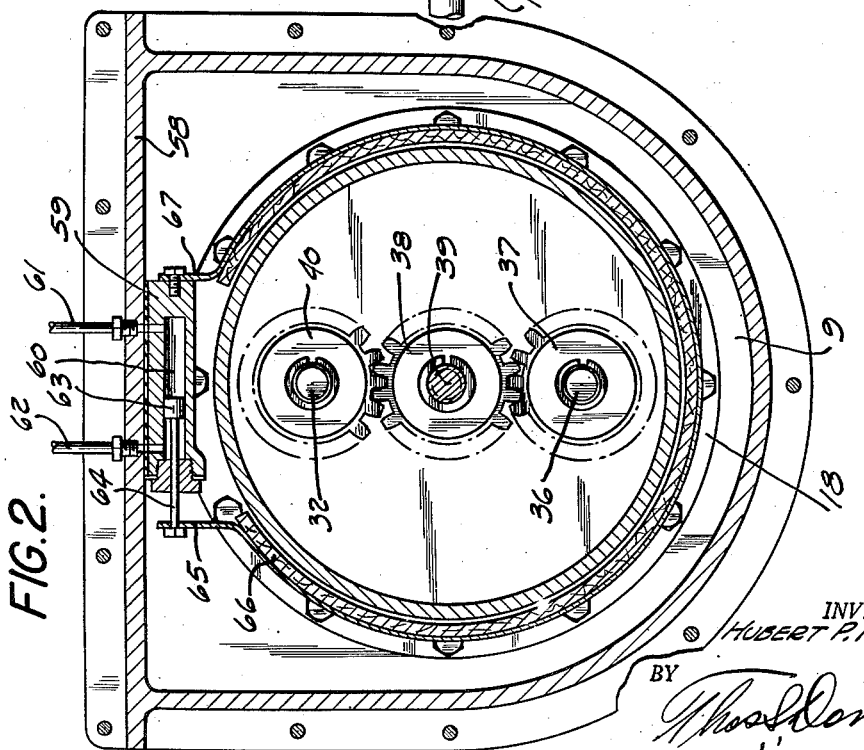
Fig. 2 is a sectional view taken on line 2—2 of Fig. 1.

As shown in the drawings, the invention is illustrated as contained within an enclosure embodying the end walls 9 and 10, this enclosure being mounted fixedly in any suitable location. Mounted in the end wall 9 is a bushing 11 to provide a bearing for the drive or power shaft 12 and a bushing 13 is mounted in the wall 10 to provide a bearing for the driven shaft 14.

Contained within the enclosure is a housing embodying a pair of sections one of which comprises the end wall 15 having a bushing 16 mounted therein through which extends the shaft 12. The other section embodies the wall 19 in which a bushing 20 is positioned to provide a bearing for the stub shaft 39. A suitable sealing gasket 21 and 22 is mounted at each of the bushings 16 and 20 respectively. Extending outwardly from the section embodying the wall 15 is a peripheral flange 17 which is in alinement with the same type of flange 18 on the other section of the housing and these flanges are bolted in clamping relation to the annular member 23 which lies between the flanges 17 and 18, suitable sealing rings 24 being used. This flange 23 extends outwardly from the plate or disk 25 in which is formed an opening 26 in which is positioned a bushing 27. An opening 28 is formed in the member 25 in which is positioned a bushing 29 and an opening 30 is also formed in this member in which is positioned the bushing 31. Rotatable in the bushing 27 is a shaft 32 fixed on which is a gear 33. This gear 33 meshes with a gear 34 which rotates in unison with the shaft 12 and this shaft 12 projects in the bushing 29 shown in Fig. 1. The gear 34 meshes with a gear 35 which is mounted on the shaft 36 rotating in the bushing 31. Fixedly mounted on this shaft 36 is a gear 37 meshing with a gear 38 fixedly mounted on the stub shaft 39 so as to rotate in unison therewith. One end of this stub shaft 39 is journaled in the bushing 29. This gear 38 also meshes with the gear 40 fixedly mounted on the shaft 32. A practical design of the foregoing gears would include gear 34 having thirty-five teeth, gear 33 having twenty-five teeth, gear 40 having twenty teeth and gear 38 having forty teeth.

Rotating freely on the stub shaft 39 is a hub 41 having the bushing 42 therein. Secured to the hub 41 by means of the bolt 44 is a plurality of radially moveable clutch members 43. Mounted on the bolt 44 is a disk 45 against which bears one end of the coil spring 46 the other end bearing against the member 43 so as to normally resist radial outward movement of these members 43. Formed in the rotor, of which the hub 41 forms a part, is a plurality of peripheral notches 47 each of which engages the axial projection 48 extending outwardly from the wall 19.

Mounted on the inner face of the clutch 50 carried by the wall 56 is a lining 49 of brake material such as fiber or the like. Extending outwardly from the wall 56 is a hub 57 which is splined to receive the splined ends of the stub shaft 39 and the driven shaft 14.

Mounted on the upper wall 58 of the enclosure is a cylinder 59 having the space 60 formed therein with which communicates the fluid delivery pipes 61 and 62 which are connected to a suitable source of vacuum or fluid pressure. Slidable in this cylinder is the piston 63 carrying the piston rod 64 to which one end of the band 65 is connected. This band is provided with a suitable brake lining 66 and the opposite end 67 of this band is connected to the cylinder 59. The construction is such that upon operating this braking band preferably by hand control of the vacuum or fluid pressure, the braking action is applied to the housing embodying the side walls 15 and 19.

Mounted on the upper wall 58 of the enclosure is a brake cylinder 68 having a piston rod 71 projecting outwardly therefrom and connected to one end of the band 69 which is provided with a lining 70 of braking material, the opposite end 72 of this band being connected to the cylinder 68. The construction is such that upon operating this braking band the braking action may be applied to the periphery of the member 50.

The construction is such that when the mechanism is mounted in a vehicle and power is transmitted to shaft 12 the shaft 14 will of course be under load. The rotation of the shaft 12 will effect the rotation of the gear 34 which will in turn effect the rotation of the gears 33 and 40 and 35 and 37 tending to rotate the gear 38. This gear 38 however, being fixedly mounted on the stub shaft 39 which is splined into the hub 57 into which the end of the shaft 14 is splined, is also under load. Consequently the resistance to the rotation to the shaft 39 will prevent a rotation of the gear 38 so that the gears 33 and 40 and the gears 35 and 37 will travel around the gear 38 and because of their connections, through the member 25 with the housing 15, will cause the housing 15 to rotate in a counter-clockwise direction when the shaft 12 is driven clockwise. This action will also effect a rotation of the rotor 41 through an engagement of the members 48 and the recesses 47. As the speed increases the members 43 will move outwardly due to centrifugal action. When these members partially engage the lining 49 they will transmit to the lining 49 a counter-clockwise torque. As the speed increases and the engagement between the members 43 and the lining 49 increases, resistance to the counter-clockwise rotation of the housing will be effected. When this resistance becomes slightly greater than the resistance of the gear 38 to rotation, the gear 38 will begin to rotate in clockwise direction thus rotating the member 50 also in a clockwise direction. It is obvious that the size of the gears 33 and 40 and gears 35 and 37 relative to the gears 34 and 38 may be as desired so that the proper gear reduction may be obtained to increase the reverse rotation of housing 15, if such proportional change is desired or necessary. In this manner variable torque may be transmitted through the shaft 14 depending upon the load. As the speed continues with the rotating of the shafts 12 and 14, the clutch 43—49 will sufficiently engage to cause the housing 15 to rotate in clockwise direction with the shaft 12. In the beginning of this movement the housing will rotate in a clockwise direction but at a slower speed than the shaft 12. As a consequence as the speed picks up and less torque is needed, less torque is provided.

Experiences have shown that a device of this class will produce the required torque dependent and in proportion to the speed and the load thus eliminating the necessity of clutches and transmission gears of various sizes. With the present structure a variable torque sensitive mechanism is provided and the exact torque required will always be obtained, resulting in a consequent improvement in the wheeling operation.

Quick acceleration can be obtained with this structure as the torque sensitiveness of the mechanism will produce the necessary variations in proportion to the speed and the load.

The brake mechanism embodying the cylinder 68, when actually in the braking position, will serve to retain the member 50 stationary. The shaft 14 would ordinarily be projected through a transmission box and by actuating the brake 70 so as to hold the member 50 stationary, a shifting of the gears may be effected in the transmission without clashing.

The brake embodying the cylinder 59 is used to grip the housing walls 15 and 19 and tend to prevent rotation of the housing 12. This is done in the event it is required that the engine act as a brake. In an instant the driving is effected through the planetary gearing. The applying of this brake embodying the cylinder 59 may also be utilized in the event that the vehicle requires a sudden surge of power for passing, in which event brake 65 will positively hold housing 15 from rotation and a direct gear reduction drive is obtained between shafts 12 and 14. In such an instance the accelerator is pressed down at the same time the brake is applied.

What I claim as new is:

1. A device of the class described, comprising: a housing; a partition in said housing in fixed relation thereto, said partition having a central opening formed therein; a driving shaft projecting at one end centrally into said housing and terminating at its inner end in said opening; a stub shaft projecting into said housing and terminating at its inner end into said opening; a planetary gearing comprising a central gear and a pair of outer gears meshing with each other, said central gear being mounted on said driving shaft in fixed relation thereto; a pair of gear supporting shafts one projecting from each of said outer gears and extending through an opening formed in said partition; a second planetary gearing in said housing embodying a central gear and a pair of outer gears, each of said outer gears being fixedly mounted on said gear supporting shafts and said central gear being fixedly mounted on said stub shaft; a cup-shaped annular member: a brake lining on the inner surface of the wall of said cup-shaped annular member; a hub projecting outwardly centrally from the face of said cup-shaped annular member, one end of said stub shaft being projected into said hub and in fixed relation thereto; a driven shaft, one end of said driven shaft extending into said hub and in fixed relation thereto; a rotor rotatively mounted upon said stub shaft exterior of said housing; a plurality of circumferentially-spaced radially movable clutch members on said rotor; a spring for normally resisting radial outward movement of said clutch members, said clutch members being in alignment with the brake lining on said cup-shaped annular member; an engagement portion on said housing adapted for engaging said clutch members of said rotor and effecting a rotation of the same in unison with said housing, said clutch members being adapted upon rotation of said housing at a predetermined speed for radially moving outwardly into engagement with said brake lining and tending to effect a rotation of said cup-shaped annular member in unison with said rotor.

2. A device of the class described, comprising: a housing; a partition in said housing in fixed relation thereto, said partition having a central opening formed therein; a driving shaft projecting at one end centrally into said housing and terminating at its inner end in said opening; a stub shaft projecting into said housing and terminating at its inner end in said opening; a planetary gearing comprising a central gear and a pair of outer gears meshing with each other, said central gear being mounted on said driving shaft in fixed relation thereto; a pair of gear supporting the shafts, one projecting from each of said outer gears and extending through an opening formed in said partition; a second planetary gearing in said housing embodying a central gear and a pair of outer gears, each of said outer gears being fixedly mounted on said gear supporting shafts and said central gear being fixedly mounted on said stub shaft; a cup-shaped annular member; a brake lining on the inner surface of the wall of said cup-shaped annular member; a hub projecting outwardly centrally from the face of said cup-shaped annular member, one end of said stub shaft being projected into said hub and in fixed relation thereto; a driven shaft, one end of said driven shaft extending into said hub and in fixed relation thereto; a rotor rotatively mounted upon said stub shaft exterior of said housing; a plurality of circumferentially-spaced, radially movable clutch members on said rotor; a spring for normally resisting radial outward movement of said clutch members, said clutch members being in alignment with the brake lining on said cup-shaped annular member; an engagement portion on said housing adapted for engaging said clutch members of said rotor and effecting a rotation of the same in unison with said housing, said clutch members being adapted upon rotation of said housing at a predetermined speed for radially moving outwardly into engagement with said brake lining and tending to effect a rotation of said cup-shaped annular member in unison with said rotor; and a braking mechanism operable at will for applying braking pressure to said housing and tending to retard rotation of the same.

3. A device of the class described, comprising: a housing; a partition in said housing in fixed relation thereto, said partition having a central opening formed therein; a driving shaft projecting at one end centrally into said housing and terminating at its inner end in said opening; a stub shaft projecting into said housing and terminating at its inner end in said opening; a planetary gearing comprising a central gear and a pair of outer gears meshing with each other, said central gear being mounted on said driving shaft in fixed relation thereto; a pair of gear supporting the shafts, one projecting from each of said outer gears and extending through an opening formed in said partition; a second planetary gearing in said housing embodying a central gear and a pair of outer gears, each of said outer gears being fixedly mounted on said gear supporting shafts and said central gear being fixedly mounted on said stub shaft; a cup-shaped annular member; a brake lining on the inner surface of the wall of said cup-shaped annular member; a hub projecting outwardly centrally from the face of said cup-shaped annular member, one end of said stub shaft being projected into said hub and in fixed relation thereto; a driven shaft one end of said driven shaft extending into said hub and in fixed relation thereto; a rotor rotatively mounted upon said stub shaft exterior of said housing; a plurality of circumferentially-spaced, radially movable clutch members on said rotor; a spring for normally resisting radial outward movement of said clutch members, said clutch members being in alignment with the brake lining on said cup-shaped annular member; an engagement portion on said housing adapted for engaging said clutch members of said rotor and effecting a rotation of the same in unison with said housing, said clutch members being adapted upon rotation of said housing at a predetermined speed for radially moving outwardly into engagement with said brake lining and tending to effect a rotation of said cup-shaped annular member in unison with said rotor; and a braking mechanism operable at will for applying a braking pressure on said cup-shaped annular member tending to retard rotation of same.

4. A device of the class described, comprising: a housing; a stationary shaft-supporting member mounted in said housing in fixed relation thereto; a driving shaft, said stationary supporting member having a central shaft receiving opening formed therein, said driving shaft projecting centrally into said housing and extending at its inner end into said opening and journalled therein; a planetary gearing comprising a central gear and a pair of outer gears meshing with each other, said central gear being fixedly mounted on said driving shaft within said housing; a gear supporting shaft projecting centrally from each of said outer gears and extending through an opening formed in said shaft-supporting member; a second planetary gearing comprising a central gear and a pair of outer gears, said outer gears being each fixedly mounted on one of said gear supporting shafts, said central gear and said outer gears being enmeshed with each other; a stub shaft extending at one end into said central opening in said supporting member and said central gear of said second planetary gearing being fixedly mounted on said stub shaft; a substantially cup-shaped member; a hub projecting centrally outwardly from the face of the cup-shaped member and one end of said stub shaft terminating in said hub, said hub being in fixed relation to said stub shaft; a driven shaft projecting at one end into said hub and in fixed relation thereto; a rotor positioned within said cup-shaped member; a plurality of radially moveable clutch members carried by said rotor and moveable outwardly in response to centrifugal force upon the rotation of said rotor, said rotor being loosely mounted on said stub shaft; a spring means for normally resisting radial outward movement of said clutch members, said clutch members, upon radial outward movement, engaging the inner surface of the wall of said cup-shaped member and tending to rotate said cup-shaped member in unison with said rotor; and an engagement member carried by said housing for engaging said clutch members of said rotor and effecting a rotation of said rotor upon rotation of said housing.

5. A device of the class described, comprising: a housing; a stationary shaft-supporting member mounted in said housing in fixed relation thereto; a driving shaft, said stationary supporting member having a central shaft receiving opening formed therein, said driving shaft projecting centrally into said housing and extending at its inner end into said opening and journalled therein; a planetary gearing comprising a central gear and a pair of outer gears meshing with each other, said central gear being fixedly mounted on said driving shaft within said housing; a gear supporting shaft projecting centrally from each of said outer gears and extending through an opening formed in said shaft-supporting member; a second planetary gearing comprising a central gear and a pair of outer gears, said outer gears being each fixedly mounted on one of said gear supporting shafts, said central gear and said outer gears being enmeshed with each other; a stub shaft extending at one end into said central opening in said supporting member and said central gear of said second planetary gearing being fixedly mounted on said stub shaft; a substantially cup-shaped member; a hub projecting centrally outwardly from the face of the cup-shaped member and one end of said stub shaft terminating in said hub, said hub being in fixed relation to said stub shaft; a driven shaft projecting at one end into said hub and in fixed relation thereto; a rotor positioned within said cup-shaped member; a plurality of radial moveable clutch members carried by said rotor and moveable outwardly in response to centrifugal force upon the rotation of said rotor, said rotor being loosely mounted on said stub shaft; a spring means for normally resisting radially outward movement of said clutch members, said clutch members, upon radial outward movement, engaging the inner surface of the wall of said cup-shaped member and tending to rotate said cup-shaped member in unison with said rotor; an engagement member carried by said housing for engaging said clutch members of said rotor and effecting a rotation of said rotor upon rotation of said housing; and a braking mechanism operable at will for retarding the rotation of said housing.

6. A device of the class described, comprising: a housing; a stationary shaft-supporting member mounted in said housing in fixed relation thereto; a driving shaft, said stationary supporting member having a central shaft receiving opening formed therein, said driving shaft projecting centrally into said housing and extending at its inner end into said opening and journalled therein; a planetary gearing comprising a central gear and a pair of outer gears meshing with each other, said central gear being fixedly mounted on said driving shaft within said housing; a gear supporting shaft projecting centrally from each of said outer gears and extending through an opening formed in said supporting member; a second planetary gearing comprising a central gear and a pair of outer gears, said outer gears being each fixedly mounted on one of said gear supporting shafts, said central gear and said outer gears being enmeshed with each other; a stub shaft extending at one end into said central opening in said supporting member and said central gear of said second planetary gearing being fixedly mounted on said stub shaft; a substantially cup-shaped member; a hub projecting centrally outwardly from the face of the cup-shaped member and one end of said stub shaft terminating in said hub, said hub being in fixed relation to said stub shaft; a driven shaft projecting at one end into said hub and in fixed relation thereto; a rotor positioned within said cup-shaped member; a plurality of radially moveable clutch members carried by said rotor and moveable outwardly in response to centrifugal force upon the rotation of said rotor, said rotor being loosely mounted on said stub shaft; a spring means for normally resisting radial outward movement of said clutch members, said clutch members upon radial outward movement engaging the inner surface of the wall of said cup-shaped member and tending to rotate said cup-shaped member in unison with said rotor; an engagement member carried by said housing for engaging said clutch members of said rotor and effecting a rotation of said rotor upon rotation of said housing; and a braking mechanism operable at will for retarding rotation of said cup-shaped annular member.

7. A device of the class described, comprising: a housing; a stationary shaft-supporting member mounted in said housing in fixed relation thereto; a driving shaft, said stationary supporting member having a central shaft receiving opening formed therein; said driving shaft projecting centrally into said housing and extending at its inner end into said opening and journalled therein; a planetary gearing comprising a central gear and a pair of outer gears meshing with each other, said central gear being fixedly mounted on said driving shaft within said housing; a gear supporting shaft projecting centrally from each of said outer gears and extending through an opening formed in said shaft-supporting member; a second planetary gearing comprising a central gear and a pair of outer gears, said outer gears being each fixedly mounted on one of said gear supporting shafts, said central gear and said outer gears being enmeshed with each other; a stub shaft extending at one end into said central opening in said supporting member and said central gear of said second planetary gearing being fixedly mounted on said stub shaft; a substantially cup-shaped member; a hub projecting centrally outwardly from the face of the cup-shaped member and one end of said stub shaft terminating in said hub, said hub being in fixed relation to said stub shaft; a driven shaft projecting at one end into said hub and in fixed relation thereto; a rotor positioned within said cup-shaped member; a plurality of radial moveable clutch members carried by said rotor and moveable outwardly in response to centrifugal force upon the rotation of said rotor, said rotor being loosely mounted on said stub shaft; a spring means for normally resisting radial outward movement of said clutch members, said clutch members upon radial outward movement engaging the inner surface of the wall of said cup-shaped member and tending to rotate said cup-shaped member in unison with said rotor; an engagement member carried by said housing for engaging said clutch members of said rotor and effecting a rotation of said rotor upon rotation of said housing; a braking mechanism operable at will for retarding rotation of said housing; and a braking mechanism operable at will for retarding rotation of said cup-shaped annular member.

HUBERT P. McALISTER.

REFERENCES CITED

The following references are of record in the file of this patent:

UNITED STATES PATENTS

| Number | Name | Date |
|---|---|---|
| 1,766,823 | Jessen | June 24, 1930 |
| 1,843,193 | Banker | Feb. 2, 1932 |
| 1,969,683 | Berry | Aug. 7, 1934 |
| 2,085,805 | Jessen | July 6, 1937 |
| 2,171,534 | Banker | Sept. 5, 1939 |
| 2,267,131 | Paulsen | Dec. 23, 1941 |

FOREIGN PATENTS

| Number | Country | Date |
|---|---|---|
| 573,771 | France | Mar. 17, 1924 |
| 772,748 | France | Nov. 5, 1934 |
| 613,078 | Germany | May 13, 1935 |